United States Patent [19]

Mullet

[11] 4,339,487

[45] Jul. 13, 1982

[54] DOOR PANEL AND MANNER OF MAKING SAME

[76] Inventor: Willis J. Mullet, 1574 Cleveland Rd., Wooster, Ohio 44691

[21] Appl. No.: 212,900

[22] Filed: Dec. 4, 1980

Related U.S. Application Data

[62] Division of Ser. No. 39,574, May 16, 1979, Pat. No. 4,238,544.

[51] Int. Cl.³ .......................... B32B 1/04; B32B 5/20
[52] U.S. Cl. ..................................... 428/71; 52/309.4; 52/309.14; 52/458; 428/76; 428/160; 428/172; 428/192; 428/304.4; 428/308.4; 428/318.4
[58] Field of Search .................. 428/71, 76, 158, 159, 428/160, 167, 174, 192, 314, 313, 315, 322, 920, 172, 304.4, 308.4, 318.4; 156/78, 79, 196; 52/455–458, 309.11, 309.7, 309.4, 309.14; 160/379, 371

[56] References Cited

U.S. PATENT DOCUMENTS

| 3,560,285 | 2/1971 | Schroter et al. | 156/79 |
| 3,583,123 | 6/1971 | Holmgren | 428/322 |
| 3,738,895 | 6/1973 | Poymal | 156/79 |

Primary Examiner—Paul J. Thibodeau
Attorney, Agent, or Firm—Hamilton, Renner & Kenner

[57] ABSTRACT

A door panel A,B having inner and outer skins 10 and 11, 110 and 111 and a rigid expanded core 15,115, filling the cavity between the skins with stiles 19,119 extending across the ends of the cavity, said panel being made by the method comprising continuously supplying two strips of sheet material 10c,110c and 11a,162b, spraying the under-surface of strip 11a,162b with expansible thermal insulating foam 34,134, bringing the strips together and moving them under heat and pressure in pressure conveyor F to expand the foam and fill the cavity between the strips, progressively forming marginal sealing portions 11b,160 of strip 11a,162b into sealing relation with the contoured edges 12,112 and 14,114 of the other strip at stations G and H, and shearing the moving composite strip into lengths at station I.

22 Claims, 38 Drawing Figures

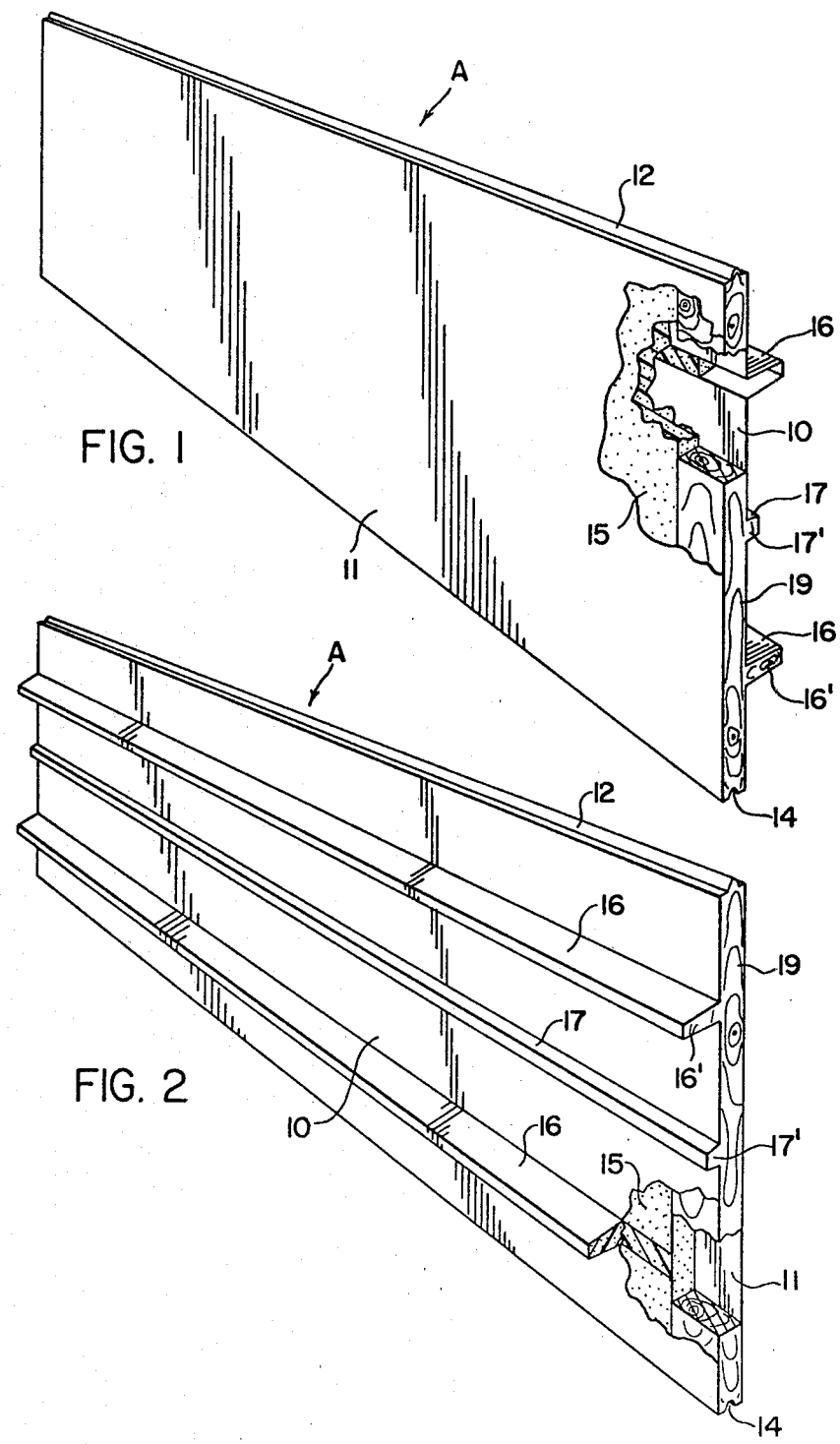

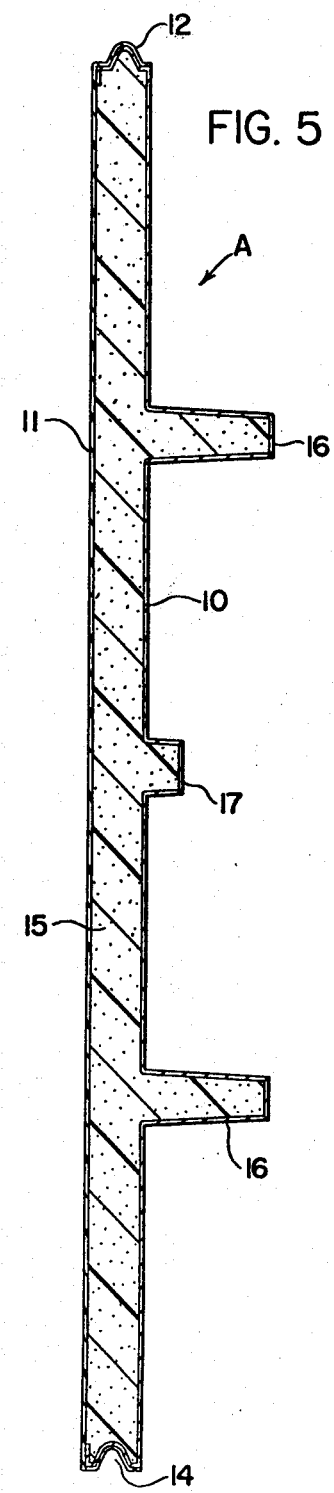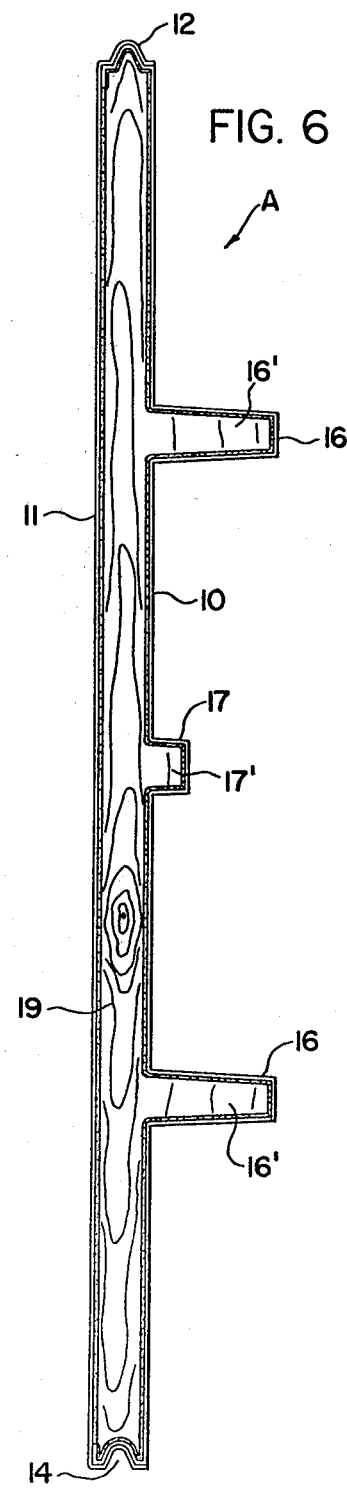

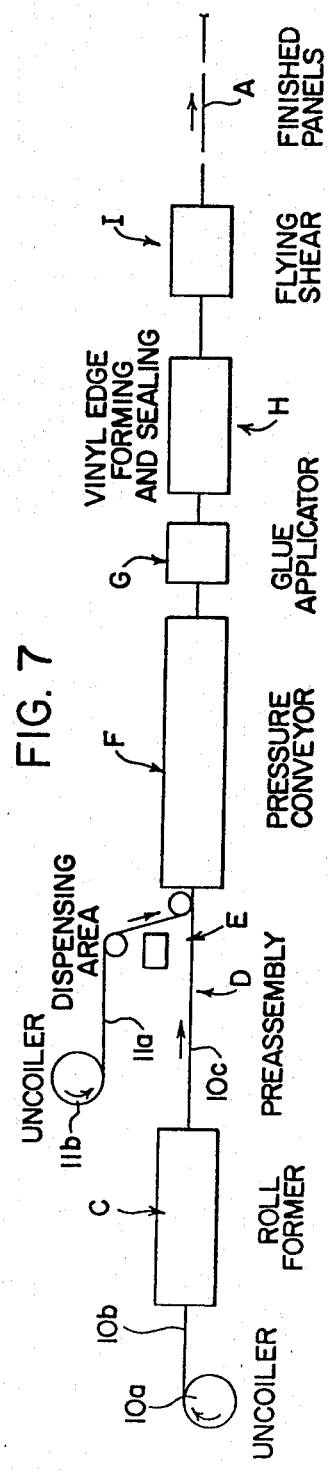
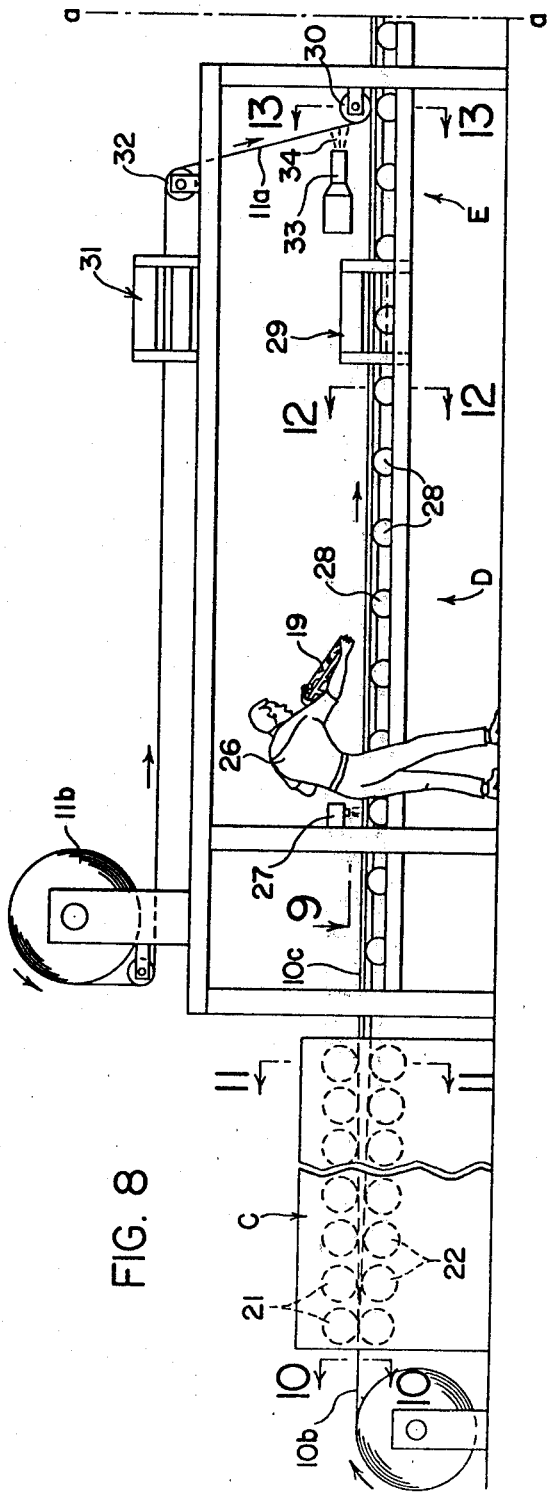

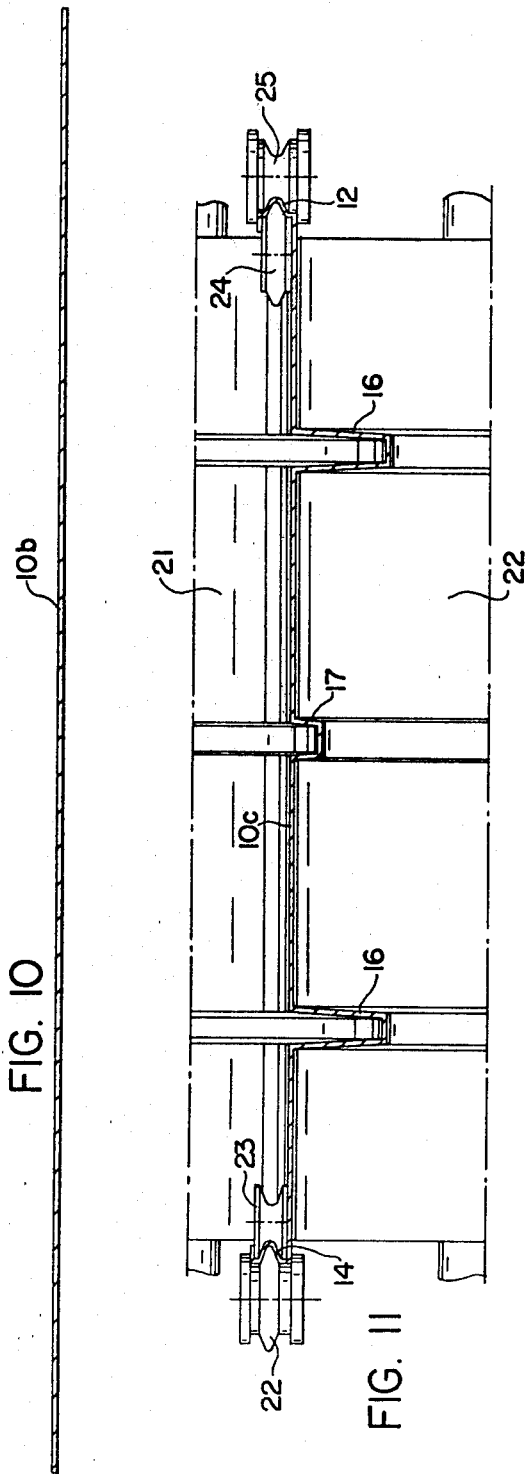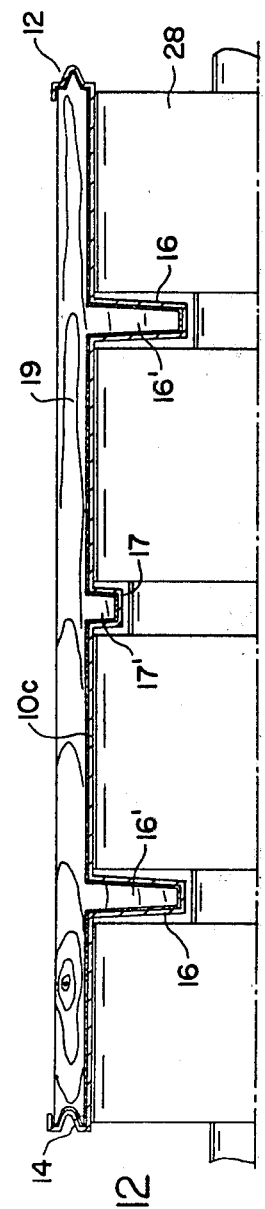

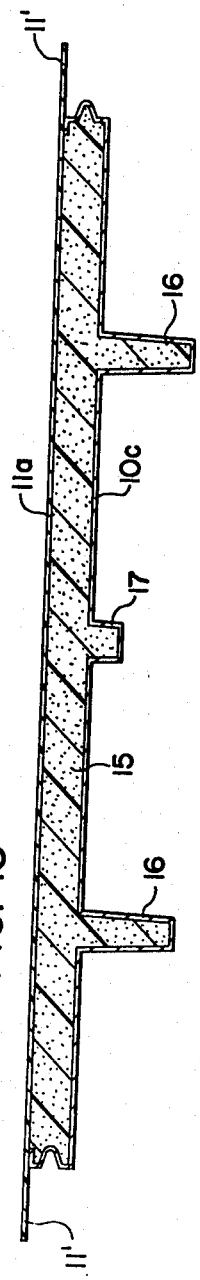
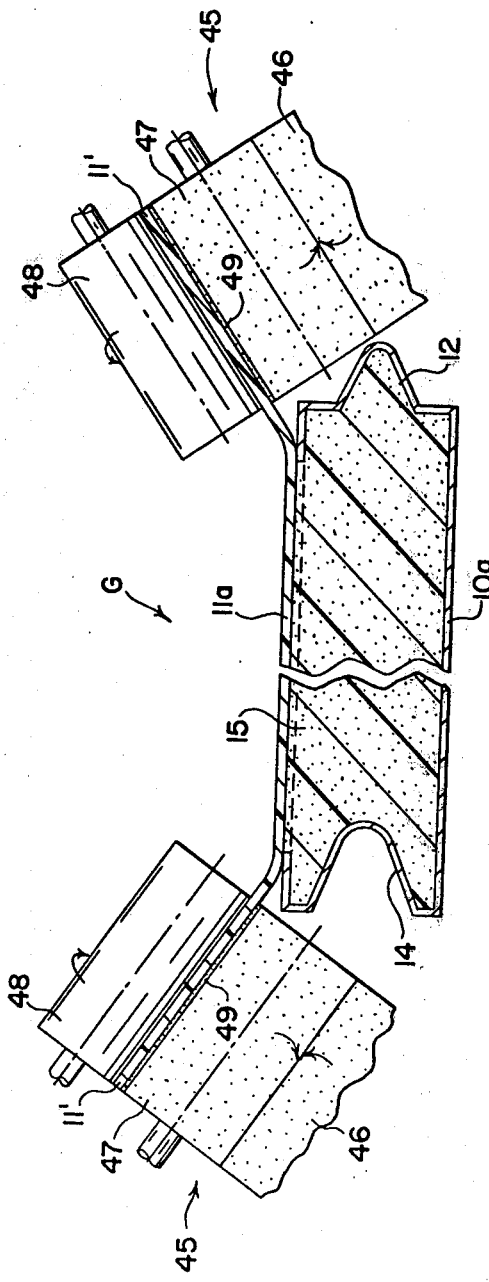
FIG. 15
FIG. 16

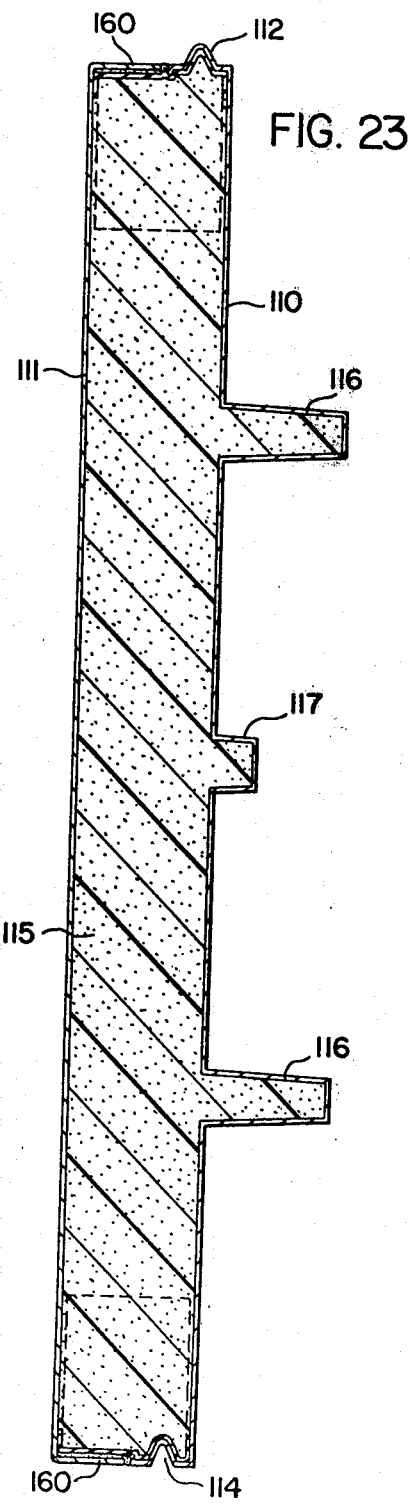
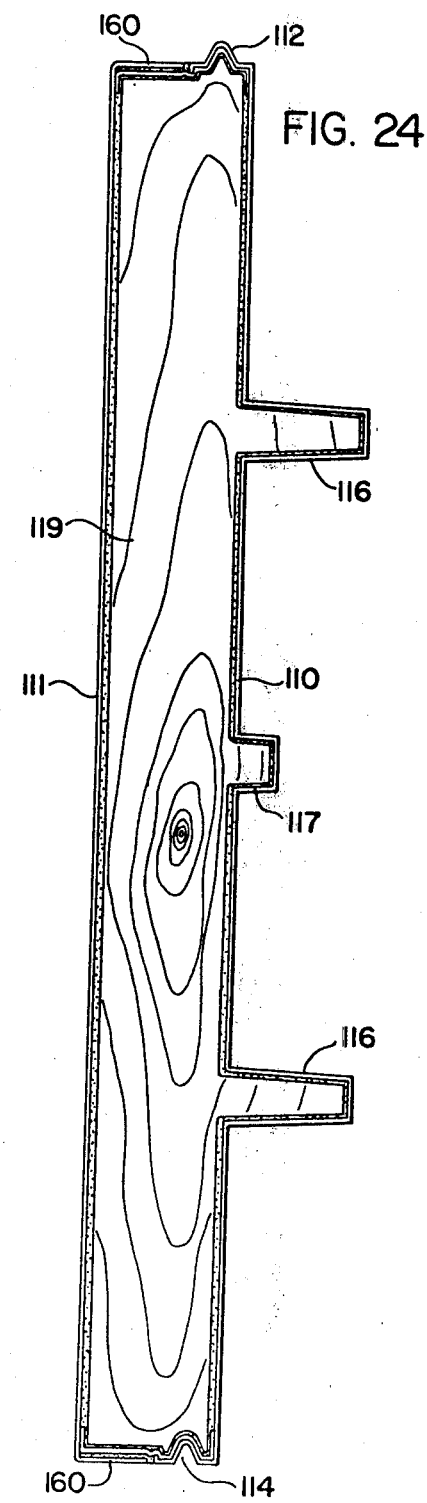

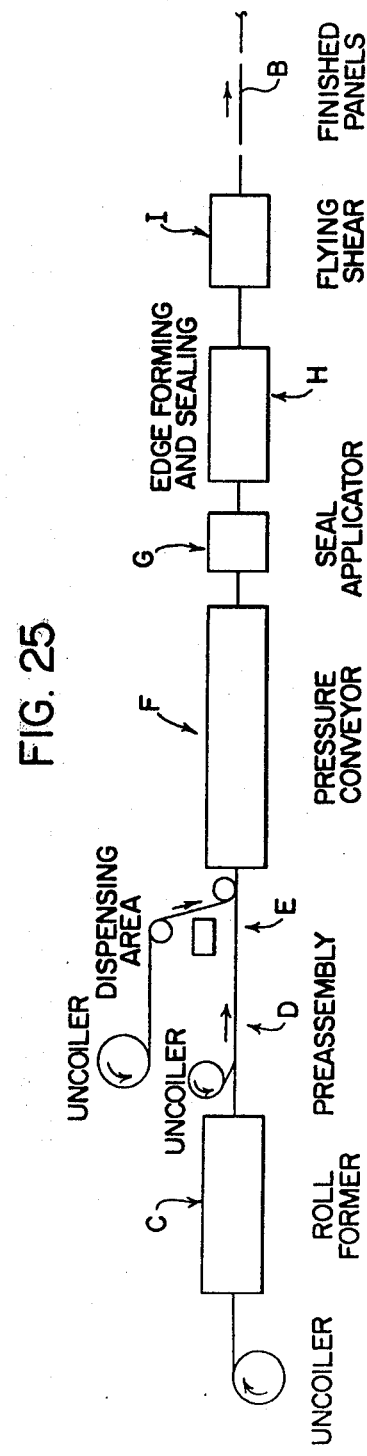

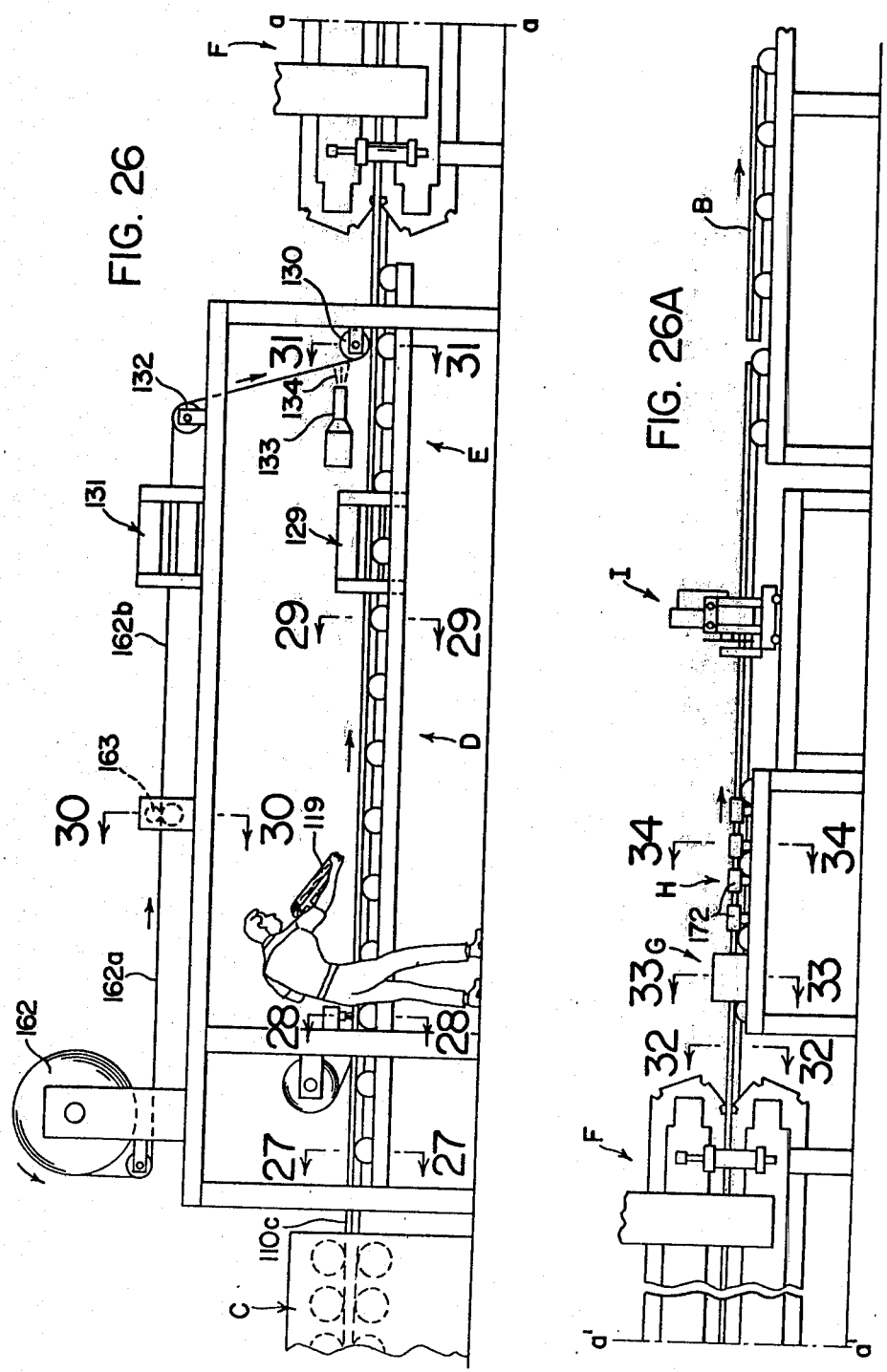

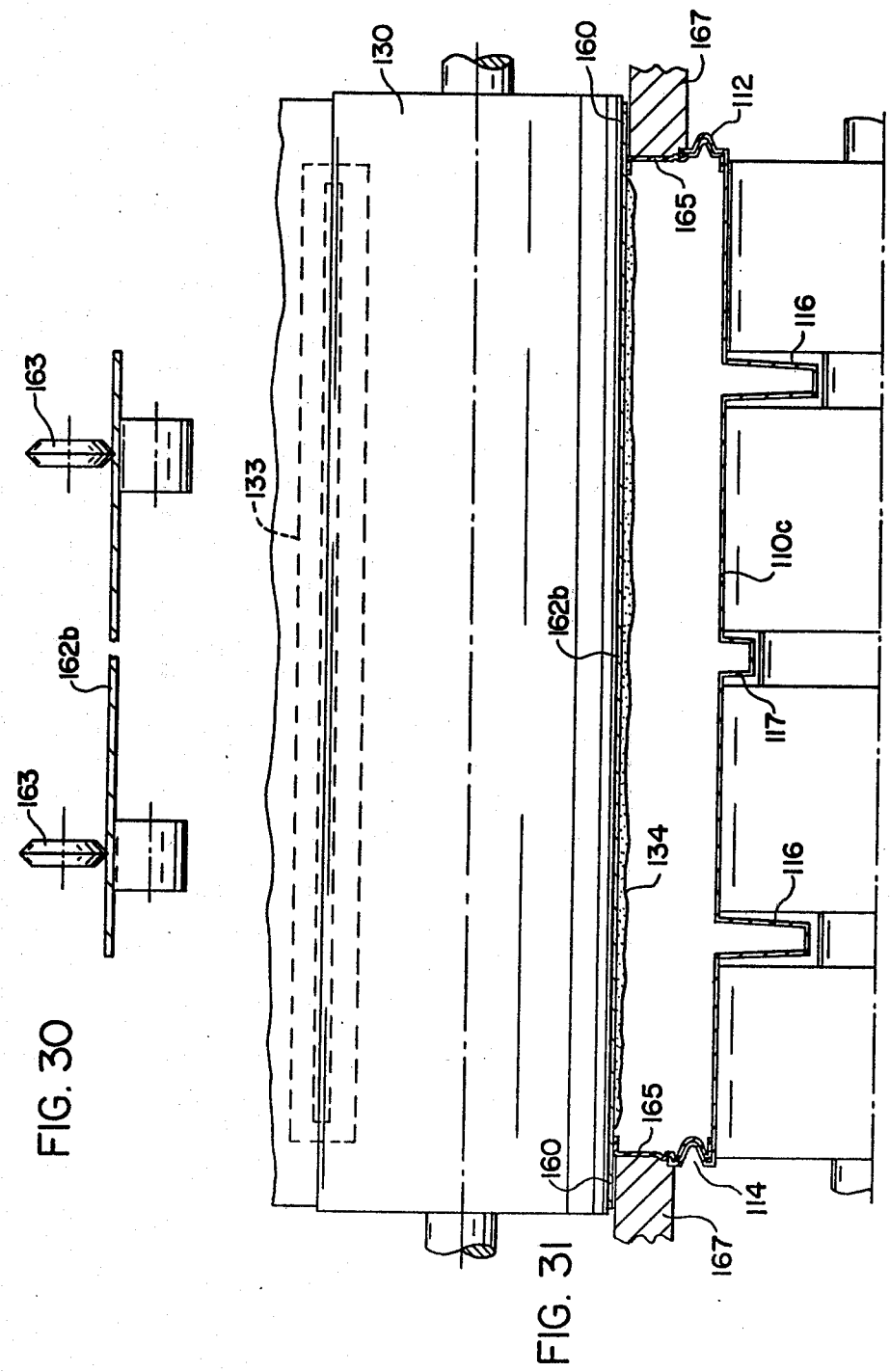

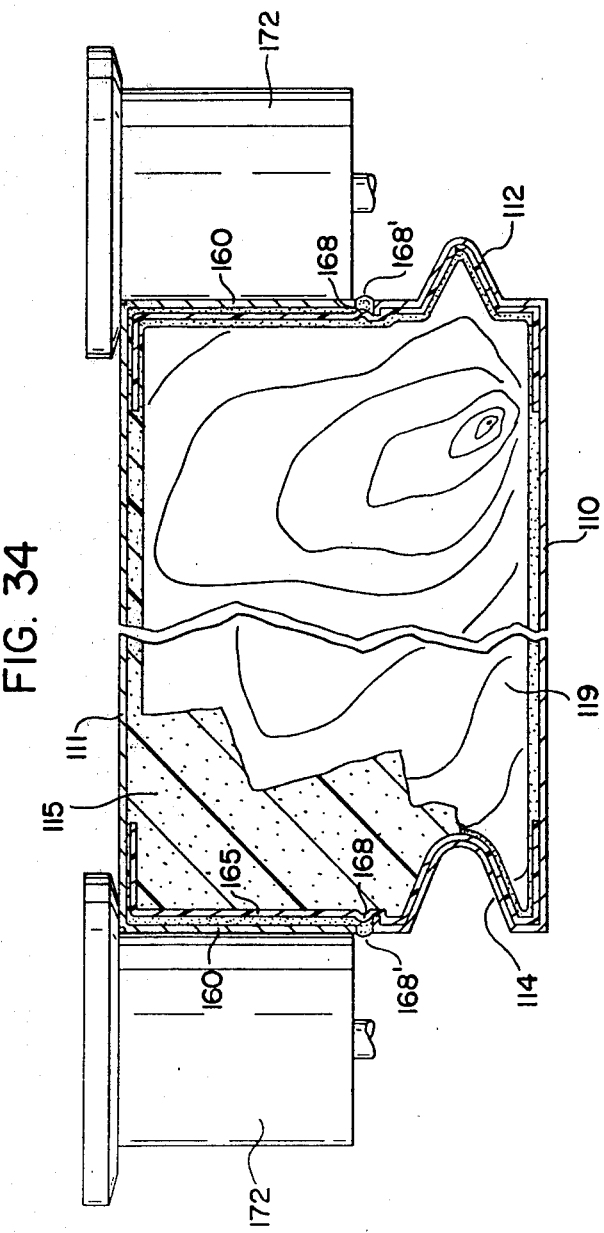

DOOR PANEL AND MANNER OF MAKING SAME

CROSS-REFERENCE TO RELATED APPLICATION

This application is a division of U.S. Ser. No. 039,574, filed May 16, 1979 now U.S. Pat. No. 4,238,544.

TECHNICAL FIELD

The invention relates to a garage door panel and the like having an improved construction adapted for continuous automated manufacture, and to an improved method and apparatus for making said panel.

BACKGROUND OF INVENTION

Garage door panels for overhead doors have been made of wood and particle board materials. Such panels are inherently moisture-absorbent and limited in length because of increased weight and the tendency to warp. As a consequence frequency repainting or waterproofing is required. The use of reinforcing ribs to inhibit warping has been proposed but this adds substantial weight and expense.

Door panels for commercial use have been hollow with walls of metal or rigid plastic materials such as fiberglass, and such doors have sometimes been provided with relatively shallow ribs to prevent flexing or "oil canning" of the walls. These panels are sometimes provided with a core of insulating material. Such door panels of which I am aware have certain disadvantages due in part to the fact that they have been manufactured by piece-by-piece methods which are time-consuming and expensive and the construction does not lend itself to manufacture by a continuous method.

Other disadvantages include the excess weight of metal doors, the brittleness and lack of durability of certain plastic materials, and the expense of inserting the insulating core material.

DISCLOSURE OF THE INVENTION

The present invention provides an improved door panel having inner and outer skins and an insulating core, said inner skin having preformed reinforcing ribs, and said panel requiring no painting to make it moisture proof. The improved panel is designed to be made by an improved continuous and automated method.

It is an object of the present invention to provide an improved door panel construction which is light in weight, thermally insulated, and highly warp-resistant over relatively long spans.

Another object is to provide an improved door panel construction having a core of expanded foam insulating material completely enclosed and bonded to the inner and outer skins.

A further object is to provide an improved door panel having preformed ribs on its inner skin, and the core of expanded foam material completely filling and bonded to said ribs.

Another object is to provide an improved door panel having preformed male and female joint portions extending throughout its side edges and wood stiles extending across its ends within the inner and outer skins.

A still further object is to provide an improved method and apparatus for continuously making the improved door panel whereby the skins are supplied in continuous strips, ribs and joint edges are preformed on at least the inner strip, wood stiles are positioned laterally thereon at intervals, expandable foam material is applied to the inner surface of the outer strip, the strips are held together under pressure while heating to expand the foam therebetween, and the composite strip is sheared into predetermined lengths.

These and other objects are accomplished by the improvements comprising the present invention, preferred embodiments of which are shown and described herein by way of example as representing the best known mode of carrying out the invention. Various modifications and changes in details of construction are comprehended within the scope of the appended claims.

BRIEF DESCRIPTION OF DRAWINGS

FIG. 1 is a perspective view, with parts broken away, of a preferred embodiment of the improved door panel looking toward the outer skin.

FIG. 2 is a similar view looking toward the inner ribbed skin.

FIG. 5 is an enlarged sectional view on line 5—5 of FIG. 3.

FIG. 6 is an enlarged end elevation on line 6—6 of FIG. 3.

FIG. 7 is a black box schematic view of the fabrication line for continuously making the improved door panel.

FIGS. 8, 8A and 8B are partially schematic side elevations sequentially showing the improved fabrication line.

FIGS. 10-13 are enlarged sectional views on lines 10—10, 11—11, 12—12 and 13—13, respectively, of FIG. 8.

FIGS. 14-18 are enlarged sectional views on lines 14—14, 15—15, 16—16, 17—17 and 18—18, respectively, of FIG. 8A.

FIG. 23 is a view similar to FIG. 5 of the second embodiment.

FIG. 24 is a view similar to FIG. 7 of the second embodiment.

FIG. 25 is a black box schematic view similar to FIG. 7, of the modified fabrication line for making the second embodiment of improved door panel.

FIGS. 26 and 26A are views similar to FIGS. 8, 8A, and 8B of the modified fabrication line.

FIGS. 27, 28, 29, 30 and 31 are enlarged sectional views on lines 27—27, 28—28, 29—29, 30—30 and 31—31, respectively, of FIG. 26.

FIGS. 32, 33 and 34 are enlarged sectional views on lines 32—32, 33—33 and 34—34, respectively, of FIG. 26A.

PREFERRED EMBODIMENT FOR CARRYING OUT THE INVENTION

Figure 3:
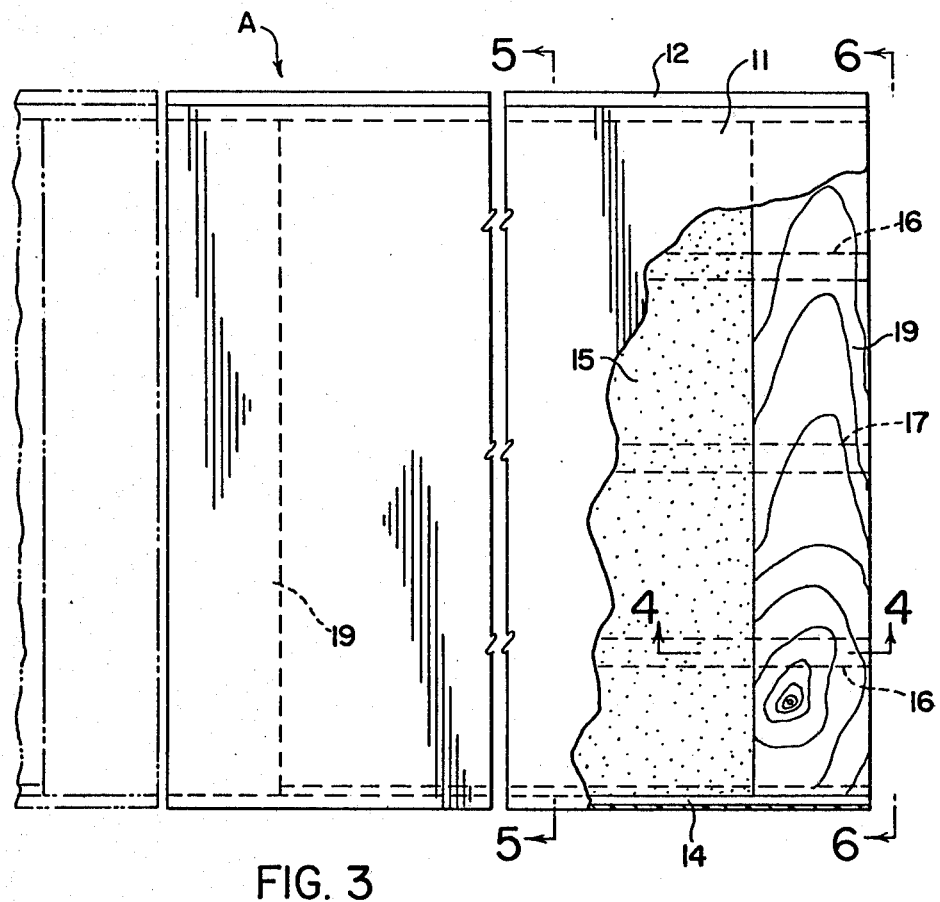
FIG. 3 is a partial elevational view, with parts broken away, looking toward the outer skin.
Figure 4:
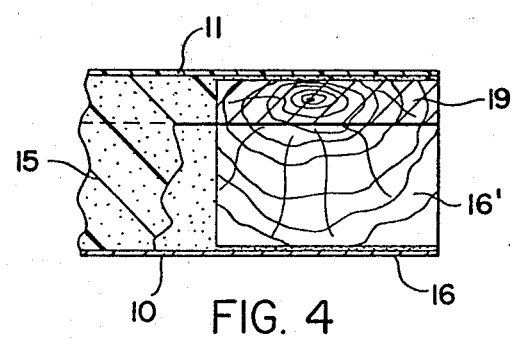
FIG. 4 is an enlarged partial sectional view on line 4—4 of FIG. 3.

Referring to FIGS. 1-6, the improved door panel is indicated generally at A and has an inner ribbed skin or wall 10 of steel or metal and an outer PVC (polyvinyl chloride) skin or wall 11 having a plane surface. The inner skin 10 has male and female contoured edge portions 12 and 14 extending along its edges and completely across the depth or thickness of the panel. A rigid expanded polyurethane core 15 is sandwiched between the skins 10 and 11 and is bonded thereto. The core material 15 extends into and completely fills the ribs 16 and 17 which are formed on the exterior of the inner skin.

Stiles 19 of wood or the like extend across and between the ends of the skins 10 and 11 and form the flush ends of the door panels A. Preferably, the stiles are provided with rib portions 16' and 17' which fit into the ribs 16 and 17, respectively, and have ends interfitting the joint edges 12 and 14. The stiles provide means for mounting the usual end hinges and track rollers (not shown) required on overhead door panels. Additional wood blocks may be inserted at intermediate points inside the edges 12 and 14 for mounting intermediate hinges.

For light duty overhead door panels the inner metal skin is treated for corrosion resistance and may have a thickness of about 30 gauge, and the outer vinyl skin is substantially rigid and durable and may have a thickness of 0.015 to 0.025 mil. This construction provides an extremely rigid door panel which has a weight up to 50% less than prior conventional panels of which I am aware.

Figure 17:
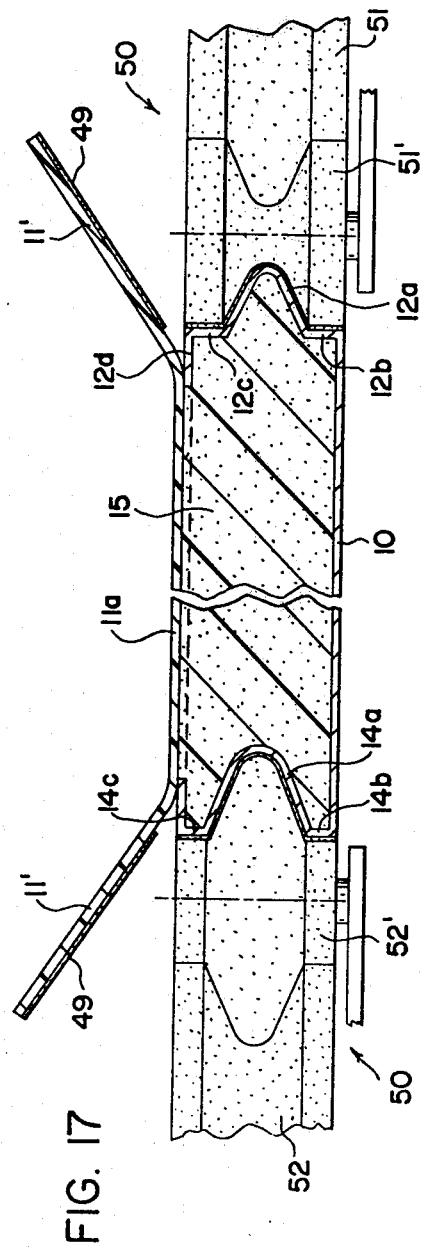

As best shown in FIG. 17, the male contoured edge 12 has a medial nose portion 12a flanked on one side by a flat strip portion 12b connected to the adjacent edge of skin 10, and flanked on the other side by a flat strip portion 12c terminating in an inturned flange 12d overlying the corner of the core 15. The female contoured edge 14 has a medial groove portion 14a flanked on one side by a flat strip portion 14b connected to the adjacent edge of skin 10, and flanked on the other side by a flat strip portion 14c terminating in an inturned flange overlying the corner of the core 15.

Figure 18:
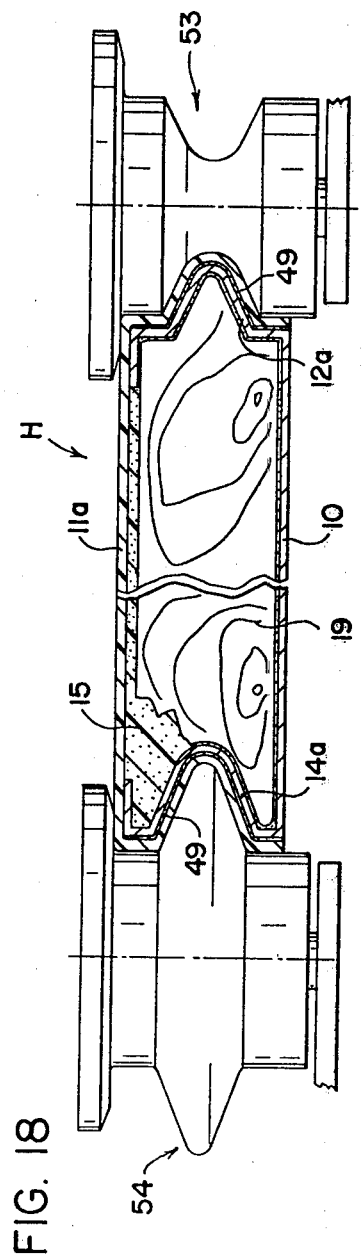
Figure 19:
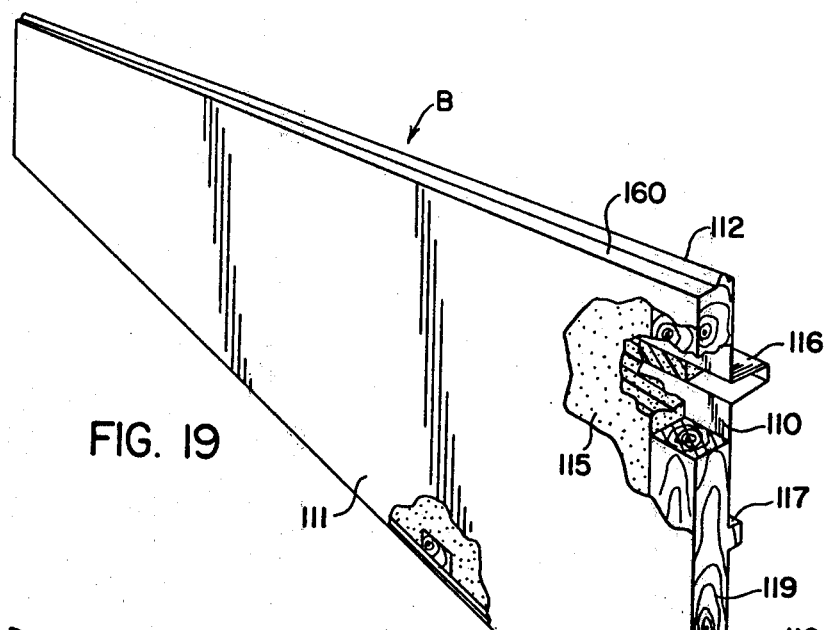
FIG. 19 is a view similar to FIG. 1 of a second embodiment of the improved door panel.
Figure 20:
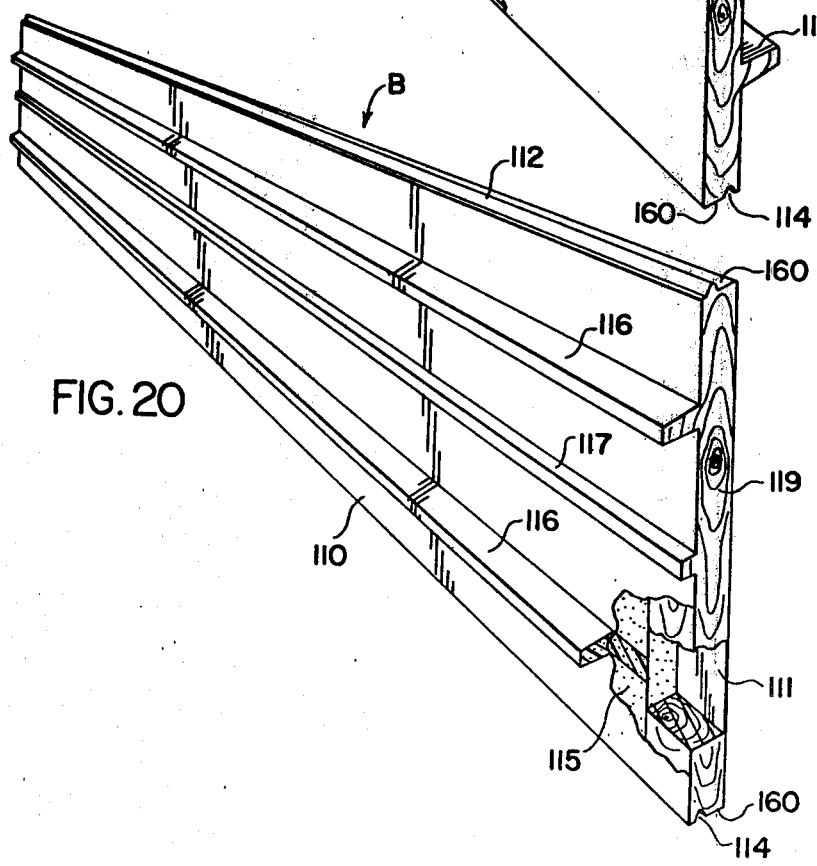
FIG. 20 is a view similar to FIG. 2 of the second embodiment.
Figure 21:
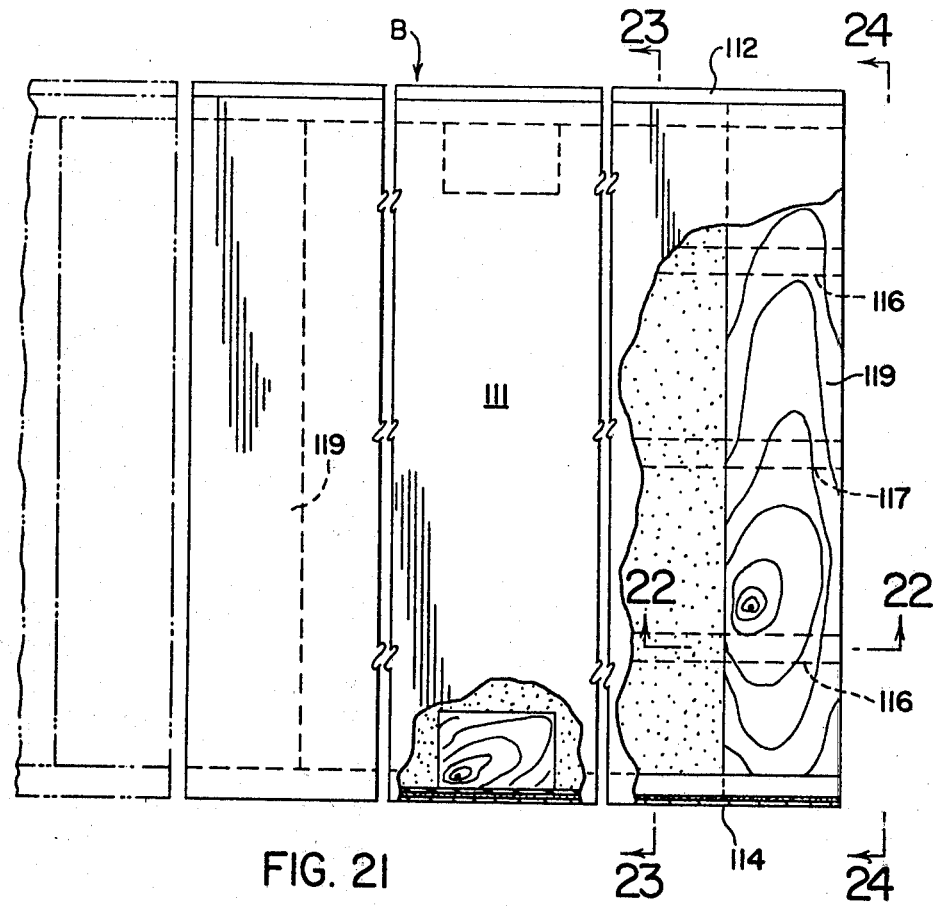
FIG. 21 is a view similar to FIG. 3 of the second embodiment.
Figure 22:
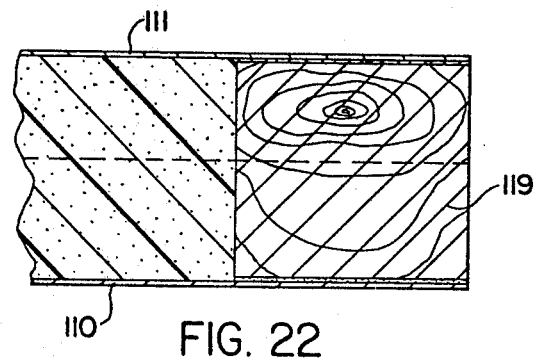
FIG. 22 is a view similar to FIG. 4 of the second embodiment.

As indicated in FIGS. 17 and 18, overlapping marginal edge portions 11' of vinyl skin 11 are folded over the male and female contoured edges 12 and 14 to conform and adhere to the surfaces thereof. The thickness of the vinyl skin is exaggerated in the drawings for the sake of clarity. It will be apparent that the finished male edge 12 is intended and adapted to nest in and form a joint with the finished female edge of a like adjacent panel hinged thereto in an overhead door in closed position.

Referring to FIG. 7, the improved fabricating line is schematically shown as including a supply coil 10a of steel strip 10b which passes through a roll-forming machine C of conventional design to progressively form the ribs and joint edges therein. The formed strip 10c is then conveyed through a preassembly station D to a dispensing station E where a vinyl strip 11a from supply coil 11b is brought down, sprayed with a heat-expandable polyurethane foam and laid over the formed strip 10c. The composite strip then passes through a pressure conveyor F where heat is applied to expand the foam, and then through a glue applicator G and vinyl edge applicator H where the vinyl is folded over and adhered to the joint edges, after which a flying shear I shears the finished strip into required lengths A.

Figure 8A:
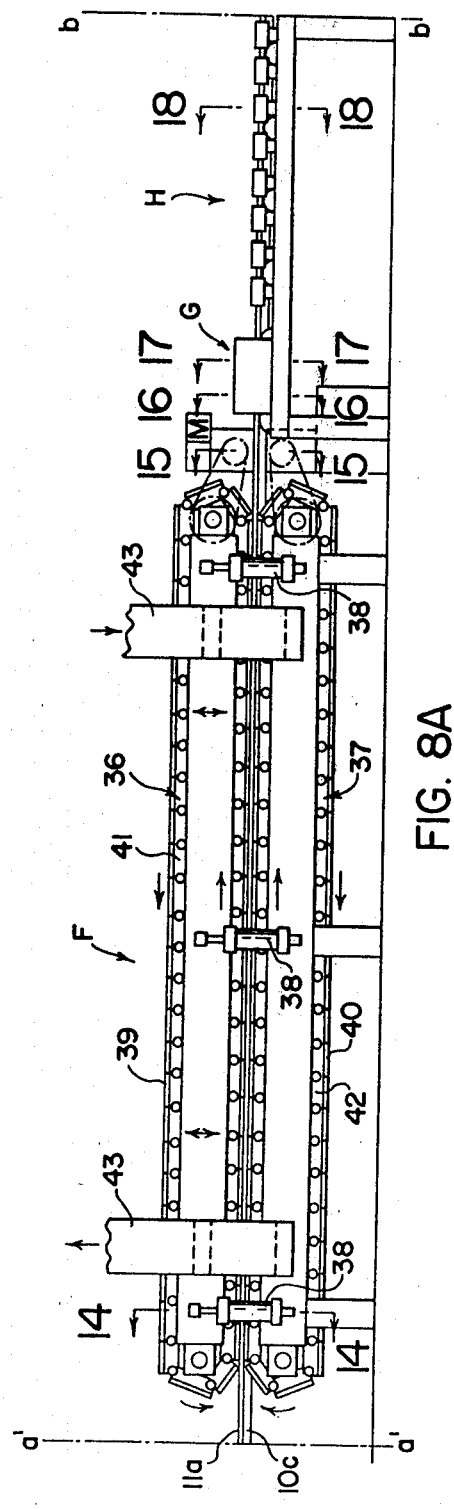
Figure 8B:
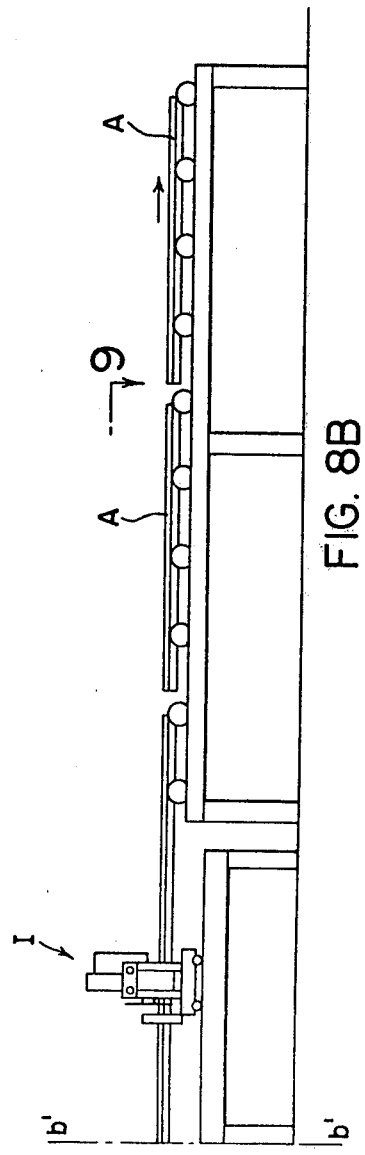

As indicated schematically in greater detail in FIG. 8, the steel strip 10b passes through a conventional multi-roll forming machine C, which has a series of horizontal ribbed rolls 21 and mating grooved rolls 22 (FIG. 11) to progressively form the ribs 16 and 17 in the strip 10c and mating vertically disposed rolls 22, 23 and 24, 25 to progressively form the male and female joint edge portions 12 and 14.

As the strip 10c passes through the pre-assembly station D a worker 26 inserts the stiles 19 into the strip crosswise at proper intervals longitudinally of the strip. As shown in FIG. 12, the stiles are preferably provided with ends interfitting the joint edges 12 and 14 and with rib portions 16' and 17' interfitting the ribs 16 and 17 previously formed on strip 10c. It may be desirable in approaching this point to spray the interior of strip 10c with an adhesive solution by means of nozzles indicated at 27, to hold the stiles at their proper locations. The strip 10c moves continuously over conveyor rolls 28 through a preheater indicated generally at 29 which heats the strip to a temperature of about 43° C. (110° F.).

At the dispensing station E, the preheated strip passes under a laminating roll 30 where the vinyl film strip 11a supplied from supply coil 11b is applied over strip 10c. The strip 11a first passes through a preheater 31 where it is heated to a temperature of about 35° C. (95° F.) and then passes over idler rolls 32 and down under the laminating roll 30. Before reaching the roll 30, the underside of the strip 11a is sprayed by means of a nozzle 33 with a wetted polyurethane foam 34 of well-known composition having the property of expanding when heated to approximately 30 times its original volume. If desired the vinyl strip may be treated prior to being sprayed by means of corona charging or calender rolls (not shown) to enhance the bonding thereto of the foam.

Figure 13:
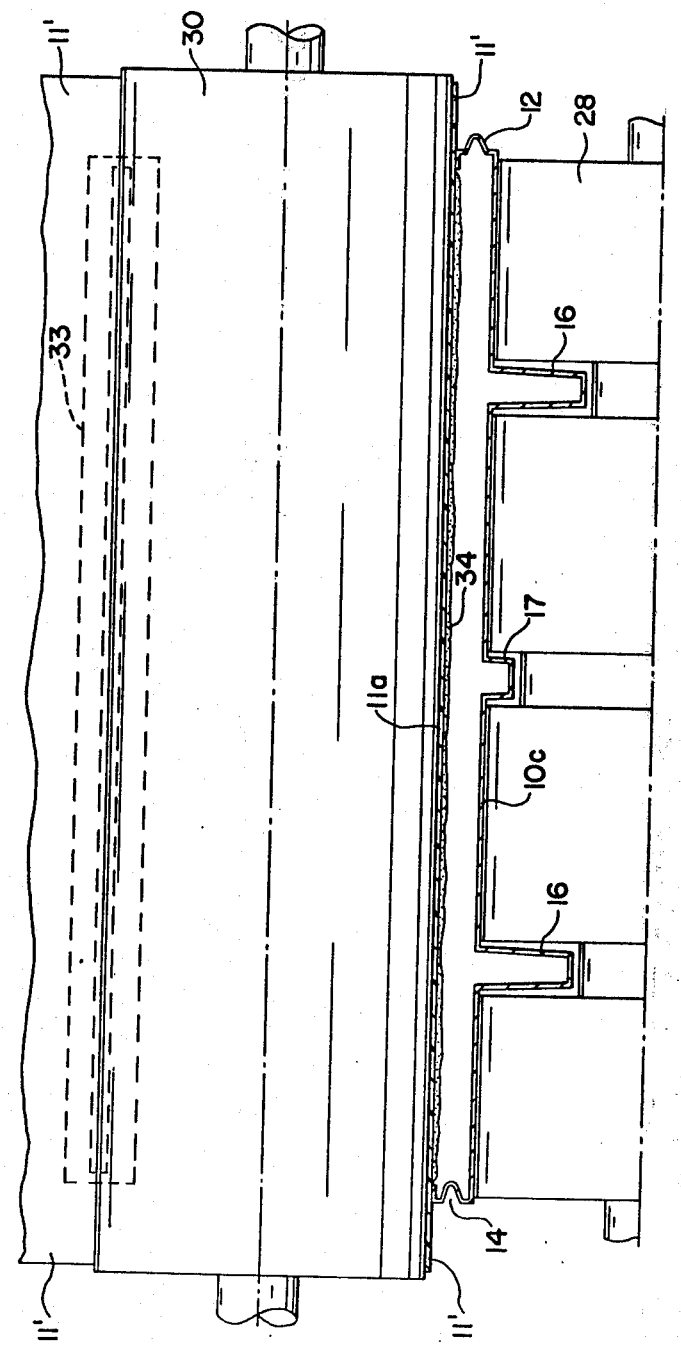

As indicated in FIG. 13, the width of vinyl strip 11a is such that its marginal edge portions 11' extend laterally beyond the edges of strip 10c, so that they can be folded down over the joint edges 12 and 14, as will be later described. The spray nozzle terminates short of these marginal portions so that they are not sprayed with foam.

Figure 14:
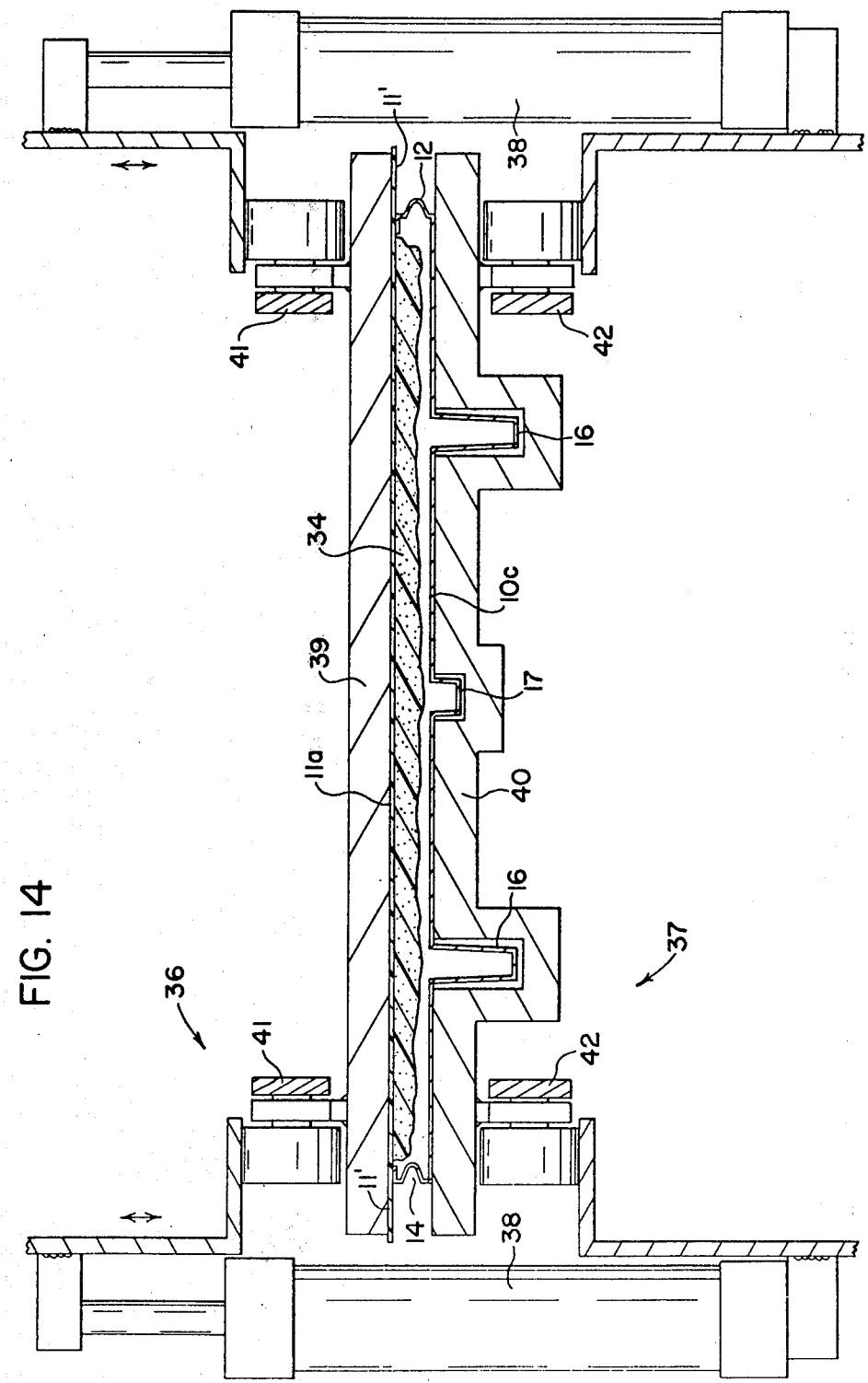

The composite strip 10c, 11a now passes into the pressure conveyor indicated generally at F which pulls the strip from stations D and E. As shown in FIGS. 8A and 14, the pressure conveyor comprises upper and lower roller chain assemblies, indicated generally at 36 and 37, the upper assembly being vertically adjustable by means of fluid cylinders 38. Pressure platens 39 and 40 are carried by upper and lower roller chains 41 and 42, respectively, for holding the strips 10c and 11a in position as the foam expands, the lower platens being grooved to receive the ribs 16 and 17 on the strip 10c.

The roller chains may be driven at the trailing end as indicated in FIG. 8A. Ducts 43 supply heated air to the chambers above and below the platens 39 and 40 to maintain a temperature of about 71° C. (165° F.), so that the foam 34 will form an expanded core completely filling the cavity between strips 10c and 11a, including the cavities within the ribs 16 and 17, as shown in FIG. 15. The expanding core exerts a pressure of 3-5 PSI on the cavity surfaces and becomes the core 15 in the finished product A in FIG. 1, so that it is both a bonding agent and a thermal insulator. It also reinforces and rigidifies the ribs 16 and 17.

The filled and cured composite strip emerges from the pressure conveyor at a temperature of about 60° C. (140° F.) and passes immediately through the adhesive applicator assembly G. Referring to FIGS. 16 and 17, a first set of applicator rolls, indicated generally at 45, may include adhesive supply rolls 46, adhesive applicator rolls 47 and backup rolls 48 for applying adhesive 49 to the undersurface of marginal portions 11' of vinyl strip 11a which overhang the joint edges 12 and 14 of strip 10c.

The second set of applicator rolls, indicated generally at 50, may include adhesive supply rolls 51 and 52, and adhesive applicator rolls 51' and 52', respectively, for applying adhesive to the surfaces of portions 12a, 12b and 12c of male joint edge 12, and to the portions 14a, 14b and 14c of the female joint edge 14. At the edge forming and sealing station H, the marginal portions 11' of the vinyl strip are folded down and progressively conformed in pressure-sealed contact with all adhesive coated surfaces of the edges 12 and 14, by series of forming and sealing rolls indicated generally at 53 and 54, so that the edges 12 and 14 are completely covered by and bonded to the vinyl skin.

Figure 9:
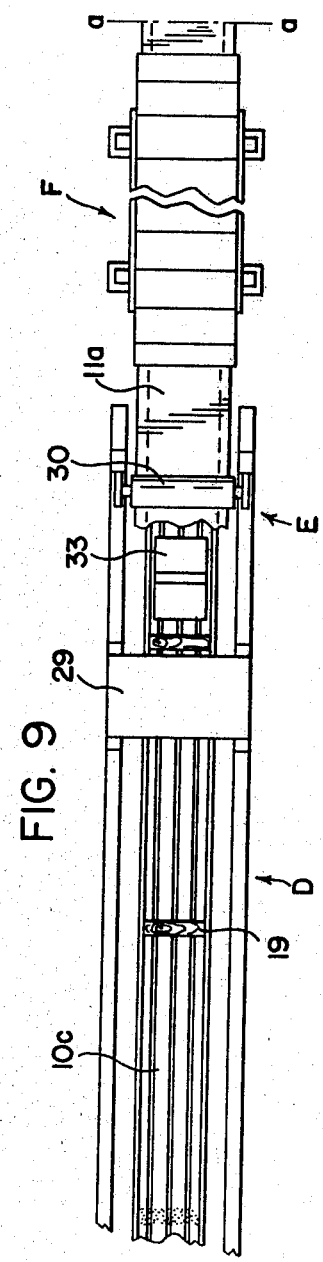
FIGS. 9 and 9A are plan views on line 9—9 of FIGS. 8, 8A and 8B.
Figure 9A:
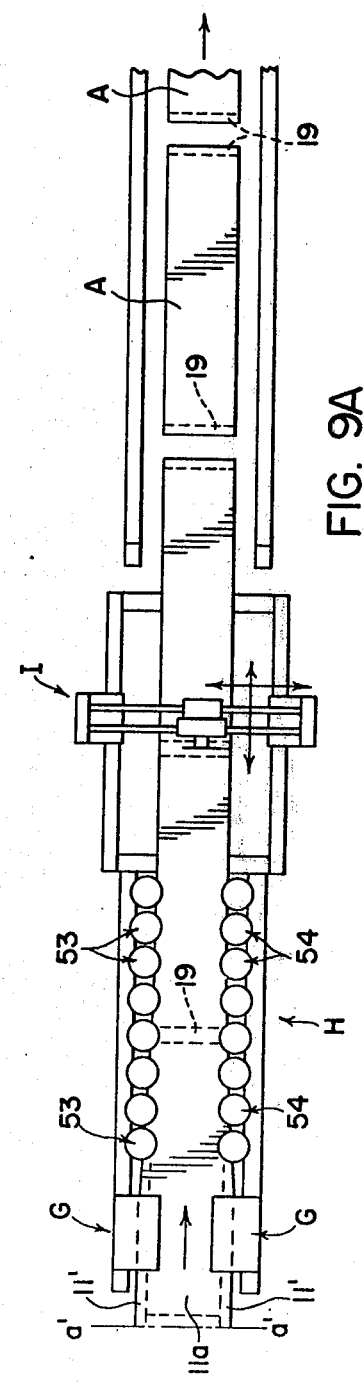

As indicated in FIG. 9A, the series of forming rolls 53 and 54 terminates in proximity to the flying shear I, so that the sealed joint edge surfaces are supported until the composite strip has nearly reached the flying shear which is timed and programmed in a usual manner to bisect the strip into lengths along the centerlines of the stiles 19, thus producing panels A of accurate predetermined lengths. The fabrication line produces finished composite strip at the rate of upwards of 30 feet per minute, depending upon the expansion rate of the urethane foam and the length of the pressure conveyor F.

The improved door panel made by the foregoing method has extremely deep hollow integral reinforcing ribs with a foamed-in-place, lightweight core resulting in a panel of much superior strength-to-weight ratio over conventional panels having added stiffening bars to minimize deflection, which add their own weight. The improved door panel is able to meet the standard deflection requirements in increased spans due to its high strength-to-weight ratio.

SECOND PREFERRED EMBODIMENT

This embodiment of the invention comprises a thicker door panel having both inner and outer skins of metal providing a stronger and more rigid panel suitable for longer spans and heavier overhead doors used in commercial installations, as for example in airplane hangars. Referring to FIGS. 19-24, the improved panel is indicated generally at B and has an inner ribbed metal skin or wall indicated generally at 110 and an outer metal skin or wall indicated generally at 111 having a plane surface. The inner skin 110 has exterior ribs 116 and 117 formed thereon and male and female contoured edge portions 112 and 114.

However, the edge portions 112 and 114 do not extend completely across the depth or thickness of the panel. As shown in FIGS. 23 and 24, the male edge portion 112 extends from the edge of skin 110 part way across the thickness of the panel, and a flange 160 extends from the edge of skin 111 across substantially all of the remaining part of the thickness, terminating just short of the male joint portion, so as to provide a gap therebetween for a purpose to be described. A similar flange 160 extends from the other edge of the skin 111, terminating just short of the female joint portion 114.

Stiles 119 of wood and the like extend across the ends of the panels B and have ends and ribs interfitting the edge portions 112 and the ribs 116 and 117, respectively. A rigid expanded polyurethane core 115 is sandwiched between the skins 110 and 111 and is bonded thereto. The exterior surfaces of the skins 110 and 111 are treated for corrosion resistance, and the skins may be 24-30 gauge, depending upon the length or span of the panel. The panel is rigid and lightweight in lengths of 40 feet and more, which is 40% longer than doors of conventional construction of which I am aware.

The fabrication line shown schematically in FIG. 25 is generally similar to that shown in FIG. 7, with certain exceptions. Referring to FIGS. 26 and 26A, the upper uncoiler or stock reel 162 supplies a steel strip 162a which passes under scoring rolls 163 to facilitate later bending the marginal flanges 160 shown in FIGS. 23 and 24. The scored steel strip 162b then passes through a heater 131 and idler roll 132 down to the laminating roll 130.

Figure 27:
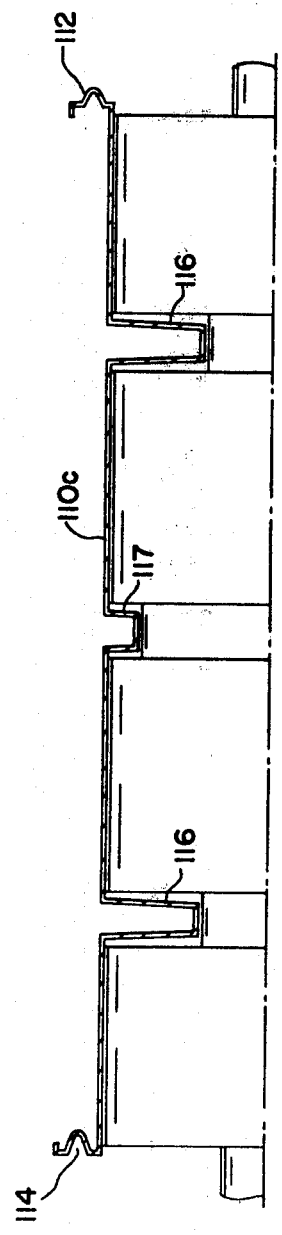
Figure 28:
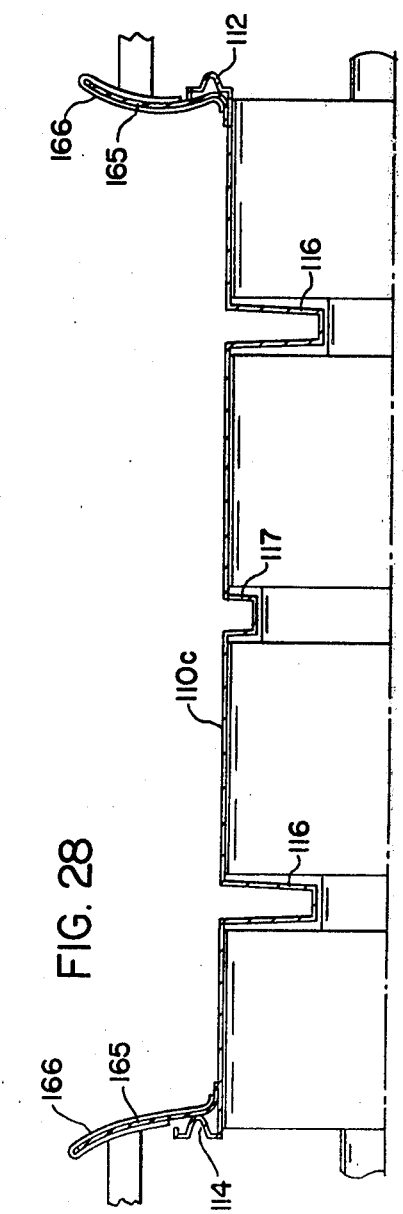
Figure 29:
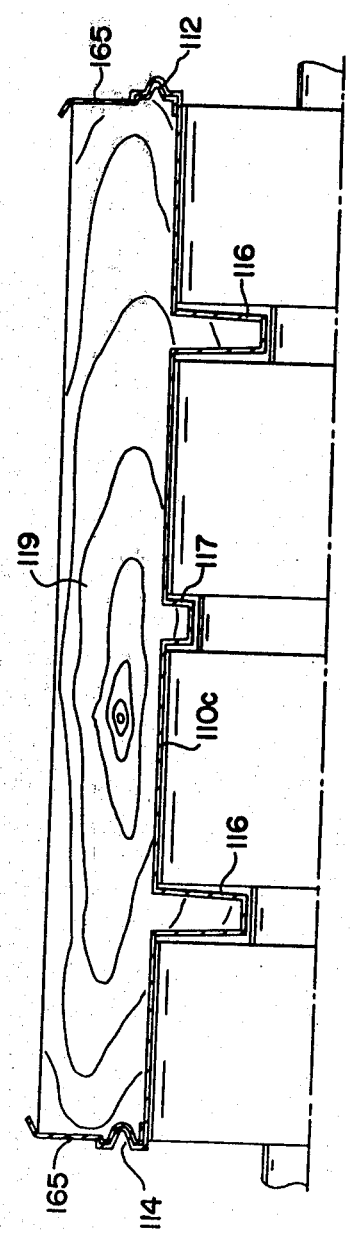

The steel strip 110c coming from the roll-forming machine C has the ribs 116 and 117 and the male and female joint edge portions 112 and 114 formed thereon, as shown in FIG. 27. As shown in FIG. 28, prior to the insertion of the stiles 119 by the workman, thin vinyl liner strips 165 may be inserted through guides 166 with their lower edge portions inside of the joint edges 112 and 114 and their upper edge portions extending above the joint edges. These upper edge portions act as temporary side walls to retain the expanding urethane foam subsequently introduced into the cavity within the strips 110c and 162b. As shown in FIG. 29, the insertion of the stiles 119 holds the vinyl strips 165 in upright positions at those points.

As shown in FIG. 26, before the preheated strip 162b reaches the laminating roll 130, its underside is sprayed by a nozzle 133 with the wetted expansible foam 134, and then brought under the laminating roll 130 into contact with the upper edges of the vinyl strips 165, as shown in FIG. 31, the strip 110c having been preheated by heater 129. Extending forwardly from the laminating rolls through the pressure conveyor F are supporting guide rails 167 laterally abutting the vinyl strips 165 under the overhanging marginal portions 160 of strip 162b.

Figure 32:
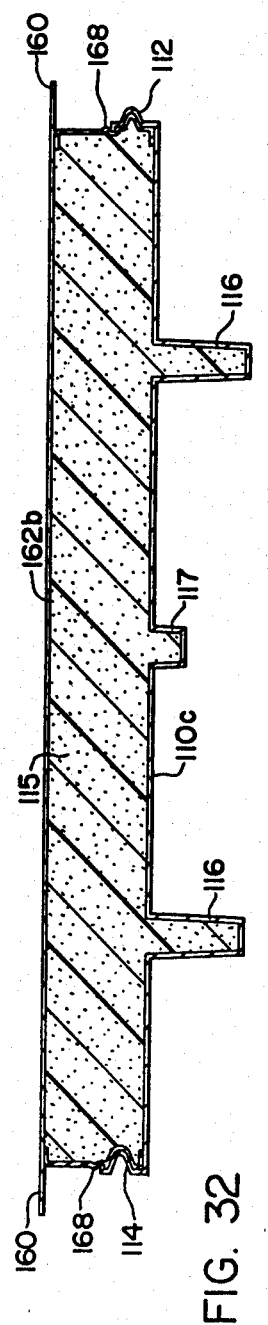

The guide rails preferably have horizontal grooves along their lower inner surfaces which form longitudinally extending beads or ribs 168 in the vinyl strips, as best seen in FIG. 32 which shows the composite strip emerging from the pressure conveyor. When the marginal flanges 160 are bent down as shown in FIG. 34, these beads 168 separate and form a thermal barrier between the adjacent edges of strips 162b and 110c.

Figure 33:
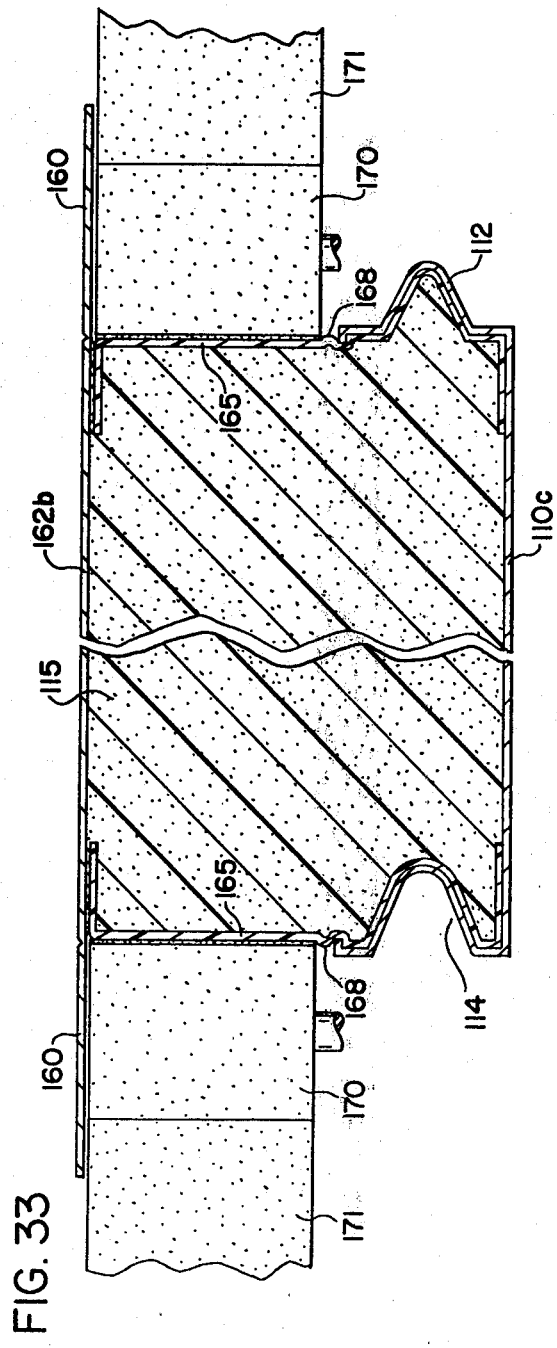

Referring to FIG. 33, adhesive applicator rolls 170 are supplied with adhesive by supply rolls 171, and the rolls 170 apply adhesive to the exterior surfaces of the upper portions of vinyl strips 165. Immediately following such application, a series of forming rolls 172 progressively bends the flanges 160 downward into contact with the adhesive, as seen in FIG. 34. This operation tends to squeeze excess adhesive 168' downward over the bead 168 to increase its thickness and enhance its thermal insulating property.

It will be apparent from the foregoing description that a novel and improved continuous automated method of manufacturing a door panel of novel construction has been provided, utilizing a fabrication line comprising an improved combination of apparatus.

I claim:

1. An overhead door panel having an inner skin having longitudinal ribs extending in a direction away from the panel and an outer skin forming a cavity between said skins, a rigid core of expanded foam thermal insulating material in said cavity and bonded to the surfaces of the skins, at least the inner skin formed of metal and having contoured side edges for conforming to like edges on like panels, stiles in the cavity extending along the ends of the panel, and means bonding the marginal edges of said outer skin to said contoured edges.

2. An overhead door panel as described in claim 1, wherein said stiles have contoured ends interfitting with said contoured edges.

3. An overhead door panel as described in claim 2, wherein the outer skin is flat with a plane outer surface.

4. An overhead door panel as described in claim 2, wherein said stiles have projections interfitting with said ribs.

5. An overhead door panel as described in claim 4, wherein said outer skin is flat with a plane exterior surface.

6. An overhead door panel as described in claim 1, wherein the outer skin is flat with a plane outer surface.

7. An overhead door panel as described in claim 1, wherein the outer skin is vinyl having marginal edge portions overlapping said contoured edges and bonded thereto by adhesive.

8. An overhead door panel as described in claim 7, wherein said stiles have contoured ends interfitting with said contoured edges.

9. An overhead door panel as described in claim 8, wherein said stiles have projections interfitting with said ribs.

10. An overhead door panel as described in claim 9, wherein said outer skin is flat with a plane exterior surface.

11. An overhead door panel as described in claim 1, wherein the outer skin is metal having marginal edge portions extending toward and terminating adjacent to said contoured edges, and the bonding means are plastic strips bonded to the inner surfaces of said contoured edges and said marginal portions.

12. An overhead door panel as described in claim 11, wherein the plastic strips have a thermal insulating bead formed between each contoured edge and the adjacent marginal edge.

13. An overhead door panel as described in claim 12, wherein said stiles have contoured ends interfitting with said contoured edges.

14. An overhead door panel as described in claim 13, wherein said stiles have projections interfitting with said ribs.

15. An overhead door panel as described in claim 14, wherein said outer skin is flat with a plane exterior surface.

16. An overhead door panel having an inner skin having integral hollow longitudinal exterior ribs extending in a direction away from the door panel and an outer skin forming a cavity between said skins and extending into said ribs, a rigid core of expanded foam thermal insulation material in said cavity, and bonded to the surfaces of the skins, at least the inner skin formed of metal and having male and female contoured side edges for conforming to like edges on like panels, and means connecting the marginal edges of the inner and outer skins.

17. An overhead door panel as described in claim 16, wherein the depth of said exterior ribs is at least substantially equal to the thickness of said panel.

18. An overhead door panel as described in claim 17, wherein the outer skin is flat having a plane outer surface.

19. An overhead door panel as described in claim 18, wherein the outer skin is vinyl having marginal edge portions overlapping and bonded to said contoured surfaces.

20. An overhead door panel as described in claim 16, wherein the outer skin is metal having side portions extending toward and terminating adjacent to the edges of said contoured side surfaces, and the connecting means are plastic strips forming thermal barriers between the adjacent edges of the inner and outer skins.

21. An overhead door panel as described in claim 20, wherein the depth of said exterior ribs is at least substantially equal to the thickness of said panel.

22. An overhead door panel as described in claim 21, wherein the outer skin is flat having a plane outer surface.

* * * * *